United States Patent
Salvermoser et al.

(10) Patent No.: US 11,798,798 B2
(45) Date of Patent: Oct. 24, 2023

(54) PHOSPHOR FOR A UV EMITTING DEVICE AND A UV GENERATING DEVICE UTILIZING SUCH A PHOSPHOR

(71) Applicant: Xylem Europe Gmbh, Schaffhausen (CH)

(72) Inventors: Manfred Salvermoser, Herford (DE); Mike Broxtermann, Münster (DE); Jan-Niklas Keil, Rheine (DE); Thomas Jüstel, Witten (DE)

(73) Assignee: Xylem Europe GmbH, Schaffhausen (CH)

( * ) Notice: Subject to any disclaimer, the term of this patent is extended or adjusted under 35 U.S.C. 154(b) by 209 days.

(21) Appl. No.: 17/276,046

(22) PCT Filed: Sep. 13, 2019

(86) PCT No.: PCT/EP2019/074518
§ 371 (c)(1),
(2) Date: Nov. 16, 2021

(87) PCT Pub. No.: WO2020/053403
PCT Pub. Date: Mar. 19, 2020

(65) Prior Publication Data
US 2022/0076940 A1   Mar. 10, 2022

(30) Foreign Application Priority Data

Sep. 13, 2018 (EP) .................... 18194253

(51) Int. Cl.
| | |
|---|---|
| *H01J 61/44* | (2006.01) |
| *H01J 61/16* | (2006.01) |
| *C01F 17/30* | (2020.01) |
| *C02F 1/32* | (2023.01) |
| *C09K 11/77* | (2006.01) |
| *H01J 61/72* | (2006.01) |
| *B82Y 20/00* | (2011.01) |
| *B82Y 40/00* | (2011.01) |

(52) U.S. Cl.
CPC .............. *H01J 61/16* (2013.01); *C01F 17/30* (2020.01); *C02F 1/325* (2013.01); *C09K 11/771* (2013.01); *H01J 61/44* (2013.01); *H01J 61/72* (2013.01); *B82Y 20/00* (2013.01); *B82Y 40/00* (2013.01); *C01P 2004/64* (2013.01); *C01P 2006/60* (2013.01); *C02F 2201/322* (2013.01)

(58) Field of Classification Search
CPC .. H01J 61/16; H01J 61/44; H01J 61/72; H01J 65/042; C01F 17/30; C02F 1/325; C02F 2201/322; C09K 11/771; B82Y 20/00; B82Y 40/00; C01P 2004/64; C01P 2006/60

See application file for complete search history.

(56) References Cited

U.S. PATENT DOCUMENTS

| | | | |
|---|---|---|---|
| 6,734,631 | B2 | 5/2004 | Juestel et al. |
| 7,935,273 | B2 | 5/2011 | Justel et al. |
| 8,647,531 | B2 | 2/2014 | Yeh et al. |
| 2005/0073239 | A1 | 4/2005 | Srivastava et al. |
| 2008/0258601 | A1 | 10/2008 | Justel et al. |
| 2012/0319011 | A1 | 12/2012 | Brabham et al. |
| 2013/0063021 | A1 | 3/2013 | Yeh et al. |

OTHER PUBLICATIONS

Balakrishna, A. et al.: Structural and photoluminescence features of Pr3+—activated different alkaline sodium-phosphate-phosphors, Journal of Alloys and Compounds, vol. 686, pp. 533-539, Lausanne, Jun. 8, 2016 (Provided by applicant) (Year: 2016).*

Pawde et al., "Optical and Bandgap Study of Rare Earth Doped Phosphate Phosphor", Journal of Materials Science: Materials in Electronics, 2017, vol. 28, No. 2, pp. 16306-16313.

Ran et al. "Synthesis, Substitutional Sites and Photoluminescence of $Na_2SrMg(PO_4)$: $Pr^{3+}$ Phosphors", Optik, 2017, vol. 148, pp. 101-105.

Zhou et al., "Insight into Eu refox and $Pr^{3+}$ 5d Emission in $KSrPO_4$ by VRBE Scheme Construction", Dalton Translations, 2018, vol. 47, pp. 306-313.

International Search Report and Written Opinion for International Application No. PCT/EP2019/074518, dated Jan. 8, 2020, 8 pages.

Balakrishna et al., "Structural and Photoluminescence Features of Pr3+-Activated Different Alkaline Sodium-Phosphate-Phosphors", Journal of Alloys and Compounds, vol. 686, Jun. 8, 2016, pp. 533-539.

* cited by examiner

*Primary Examiner* — Donald L Raleigh
(74) *Attorney, Agent, or Firm* — RATNERPRESTIA

(57) ABSTRACT

The invention relates to a phosphor for a UV emitting device, having the formula $Na_{1+x}Ca_{1-2x}PO_4:PR^{3+}_x$ wherein $0<x<0.5$.

17 Claims, 2 Drawing Sheets

PHOSPHOR FOR A UV EMITTING DEVICE AND A UV GENERATING DEVICE UTILIZING SUCH A PHOSPHOR

CROSS REFERENCE TO RELATED APPLICATIONS

This is the U.S. National Phase application of PCT/EP2019/074518, filed Sep. 13, 2019, which claims priority to European Patent Application No. 18194253.3, filed Sep. 13, 2018, the disclosures of each of these applications being incorporated herein by reference in their entireties for all purposes.

FIELD OF THE INVENTION

The present invention relates to a phosphor for a UV emitting device and to a UV generating device comprising such a phosphor.

BACKGROUND OF THE INVENTION

A phosphor in this context is a chemical composition, which is absorbs electromagnetic radiation of a certain energy and subsequently re-emits electromagnetic radiation exhibiting a different energy. Such phosphors are for example commonly known from fluorescent lamps. The term "phosphor" must not be understood as the chemical element Phosphorus.

UV-C emitting gas discharge lamps such as low pressure or medium pressure Hg discharge lamps are widely used for disinfection purposes in water and wastewater applications. They are also useful for so-called "advanced oxidation processes" for cracking highly persistent fluorinated or chlorinated carbons.

Low pressure mercury gas discharge lamps emit UV-C mainly at 254 nm wavelength, which is radiated through the wall material of the lamps and sheath tubes, which are usually made of quartz. This part of the radiation is directly effective in damaging DNA of e.g. bacteria and viruses. However, a significant proportion of about 15% of the total radiation energy, produced inside the lamp, is located in the shorter wavelength range around 185 nm, and when Xe excimer lamps are used, even in the range 172 nm±8 nm. This part of the electromagnetic spectrum is called "vacuum ultraviolet" (VUV). A large part of this high energy radiation is absorbed by the quartz body of the lamp and thus lost for the application.

Several phosphors have been proposed which convert radiation of 170 nm to 185 nm wavelength into longer wavelengths around 250 nm, for example in the documents U.S. Pat. No. 6,734,631 B2, US 2005/0073239 A1, US 2012/0319011 A1, US 2008/0258601 A1, U.S. Pat. Nos. 7,935,273 B2 and 8,647,531 B2. These documents are herewith incorporated by reference.

The phosphors proposed in the prior art documents have several drawbacks in the technical applications mentioned above.

First of all, many phosphors contain rare and expensive elements, making the use in large-scale installations too expensive. Furthermore, some of the compounds of the prior art do not show the desired long-term stability, which is necessary for example in municipal installations, e.g. water works and the like. When applied to the inside of a quartz body of a low pressure mercury discharge lamp, radiation and especially the presence of mercury atoms leads to a deterioration of the known phosphors and consequently to a loss in efficiency. Finally, phosphors containing Yttrium absorb some of the short wavelengths without emitting a UV-C photon and therefore do not significantly increase the radiation output in the desired UV-C range.

Phosphors of the type $NaMPO_4:Pr^{3+}$ and especially a phosphor having the composition $NaCaPO_4:Pr^{3+}$ are disclosed in Balakrishina, A. et al.: "*Structural and photoluminescence features of $Pr^{3+}$-activated different alkaline sodium-phosphate-phosphors*", Journal of Alloys and Compounds, vol. 686, pages 533-539, Lausanne, Jun. 8, 2016. This document investigates the properties of phosphors in absorbing light in the 420 nm to 475 nm wavelength range and emitting light at 605 nm wavelength, thus converting blue light to red light as a source of red light in tricolor systems used for solid state lighting. The respective phosphors were not studied or proposed for UV applications.

Therefore, it is an object of the present invention to provide a novel phosphor for UV emitting devices, which improves on the deficiencies mentioned above. Furthermore, it is an object of the present invention to provide a UV generating device with comprising such a phosphor.

SUMMARY OF THE INVENTION

This object is achieved by a phosphor as described herein and by a UV generating device as described herein.

DETAILED DESCRIPTION OF EMBODIMENTS OF THE INVENTION

Figure 1:
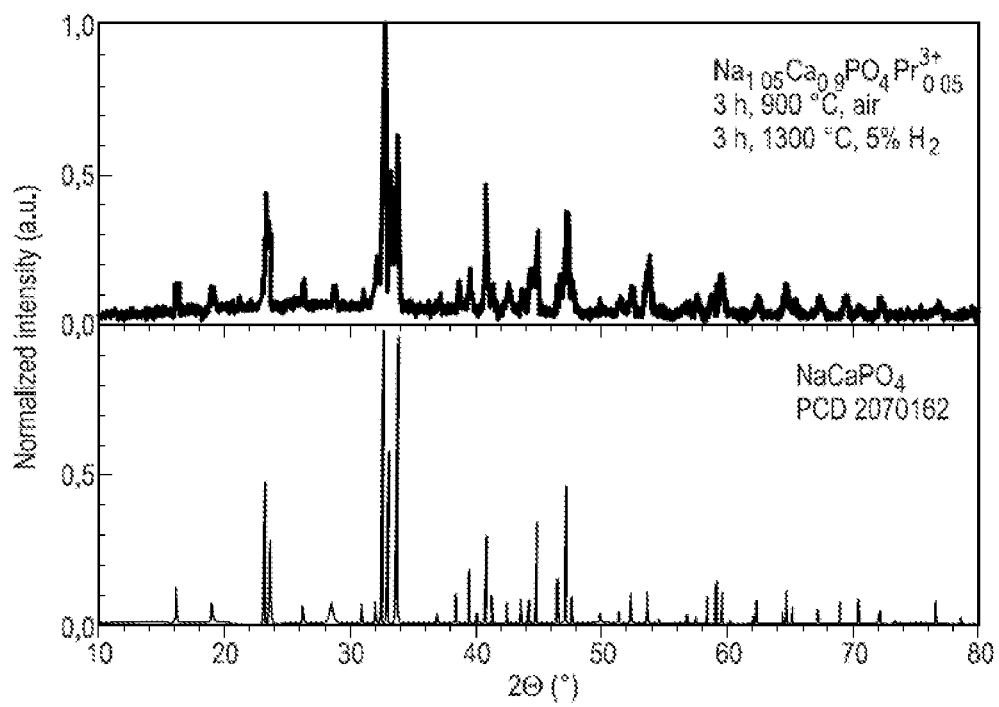
FIG. 1 shows an XRD pattern of an exemplary phosphor $Na_{1.05}Ca_{0.9}PO_4:Pr^{3+}_{0.05}$ (top) according to an embodiment of the present invention, and a respective reference pattern of $NaCaPO_4$ (bottom)

A novel phosphor for a UV emitting device, having the formula

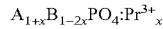

$$A_{1+x}B_{1-2x}PO_4:Pr^{3+}_x$$

wherein
A is Na, and
B is Ca, and 0<x<0.5
solves the problem defined above.

The formula is $Na_{1+x}Ca_{1-2x}PO_4:Pr^{3+}_x$ because at least the metals Na and Ca in this formula are very abundant and available at low cost.

Good results are generally achieved when the value of x is 0<x<0.25, preferably the value of x is 0<x<0.1.

Still better results are achieved when the value of x is 0.01<x<0.1, and preferably the value of x is 0.03<x<0.07, especially when x is 0.04<x<0.06.

A UV generating device with a UV radiation source comprising a phosphor as described above also solves the object of the invention, because a UV-C source is provided with a relatively cost-effective phosphor having good VUV to UV-C conversion efficiency and long-term stability.

Preferably the UV radiation source is a gas discharge lamp, especially a low pressure mercury amalgam gas discharge lamp or an excimer gas discharge lamp.

It is preferred that the UV radiation source is an excimer gas discharge lamp with a gas filling that predominantly emits the Xenon excimer spectrum at VUV wavelengths around 172 nm is advantageous in this case. The gas filling may preferably contain more than 50% by volume of Xenon.

For environmental considerations it is preferred that the UV radiation source is an excimer gas discharge lamp with a gas filling that is essentially free of mercury.

It is generally known how to produce phosphors of a given formula using wet chemistry. Generally, the compounds are used in batches in the form of oxides or phosphates in the desired molar ratio. These substances are then suspended in distilled water and, under stirring, $H_3PO_4$ is added and the suspension is stirred for several hours at ambient temperature. The suspension is then concentrated in an evaporator and dried. The solid residue is grounded in a mortar. The powder can then be calcinated at high temperatures with exposure to air, for example up to 1000° C. for 2-4 hours. After cooling to ambient temperature, the phosphor results as a solid. The phosphor can additionally be washed with distilled water, filtered off and dried in order to obtain a pure white powder.

In a preferred embodiment, the molar ratio of the compounds is chosen such that the phosphor obtained after the procedure has the formula $Na_{1.05}Ca_{0.9}PO_4:Pr^{3+}_{0.05}$. This phosphor has been tested, and it has been established that the phosphor absorbs UV-radiation at a wavelength of 172 nm and 185 nm and re-emits a significant portion of the absorbed energy in a wavelength range between 230 and 260 nm. The phosphor is essentially free of Yttrium, which means that Yttrium is present only up to concentrations which qualify as unavoidable impurities.

In another preferred embodiment, the phosphor described above is applied to the outside or preferably to the inside of a quartz tube, which is the lamp body of a UV-emitting gas discharge lamp. The lamp may be of the low-pressure mercury amalgam gas discharge type or the Xe excimer lamp type. A coating can be applied to the lamp body by wet or dry deposition methods. These methods are known in the prior art.

In a preferred embodiment, the gas filling of the lamp is essentially free of mercury, namely free of mercury except for unavoidable impurities. It is furthermore preferred that the UV radiation source is an excimer gas discharge lamp with a gas filling that predominately emits the 2. Xenon excimer continuum.

EXAMPLES

In the following, an example of the preparation and properties of phosphors according to the present invention are disclosed.

Example 1: Preparation and Properties of $Na_{1.05}Ca_{0.9}PO_4:Pr^{3+}_{0.05}$

The powdered educts $Na_2CO_3$ (1.3911 g, 13.12 mmol), $CaCO_3$ (2.2520 g, 22.20 mmol), $NH_4H_2PO_4$ (2.8758 g, 25.00 mmol) and $Pr_6O_{11}$ (0.2128 g, 0.21 mmol) were thoroughly ground into a homogeneous mixture under the addition of a few milliliters of ethanol within an polyethene (PE) bottle on a roller band for 16 h. After the ethanol evaporated completely, the resulting mixture was transferred into a porcelain crucible and was annealed for 3 hours at 900° C. under ambient atmosphere. After the first annealing step, the sample material was again homogenized utilizing the roller belt method described above. After drying, the resulting pulverized sample was transferred into a corundum crucible and was heated for 3 hours at 1300° C. under 5% $H_2$-atmosphere. The yielded light green powder was characterized as phase pure $NaCaPO_4$, crystallized in space group $Pna2_1$ (33) via PXRD and a respective matching with a reference spectrum, taken from a PCD database entry (PCD Entry No.: 2070162). The as prepared material was then ground to a mean particle size distribution of <40 μm via agitation within a PE bottle under addition of a few milliliters of ethanol on a roller band for several hours before a final drying step.

Figure 2:
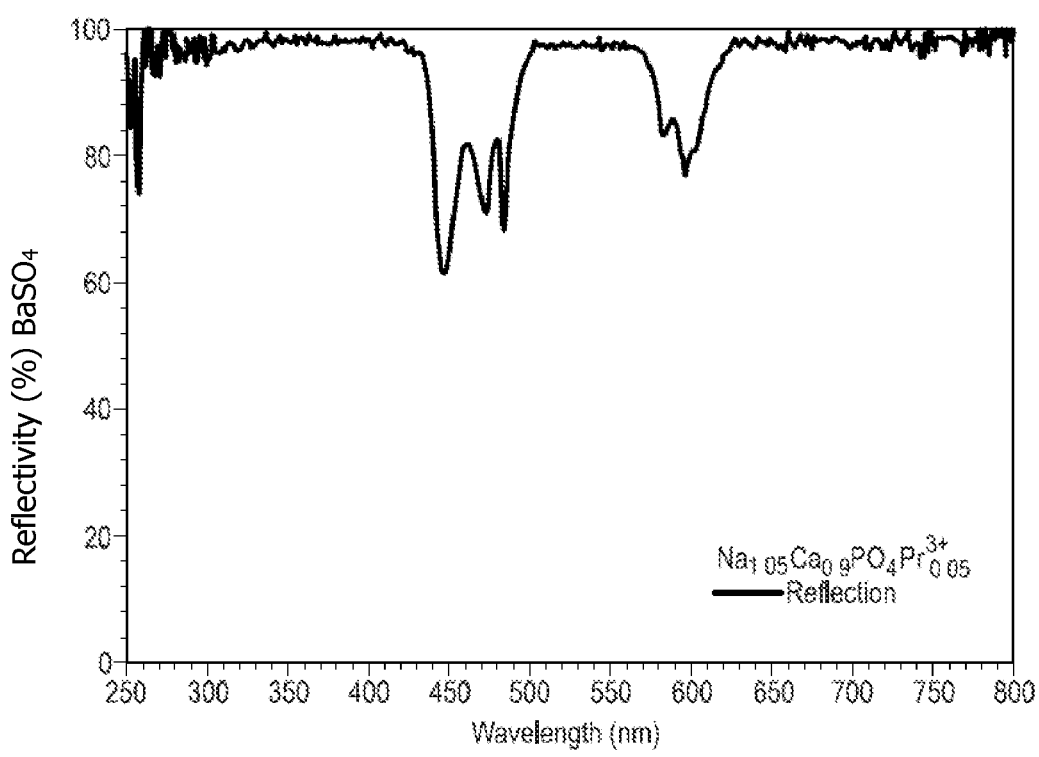
FIG. 2 shows a reflection spectrum of an exemplary phosphor $Na_{1.05}Ca_{0.9}PO_4:Pr^{3+}_{0.05}$, according to an embodiment of the present invention.
Figure 3:
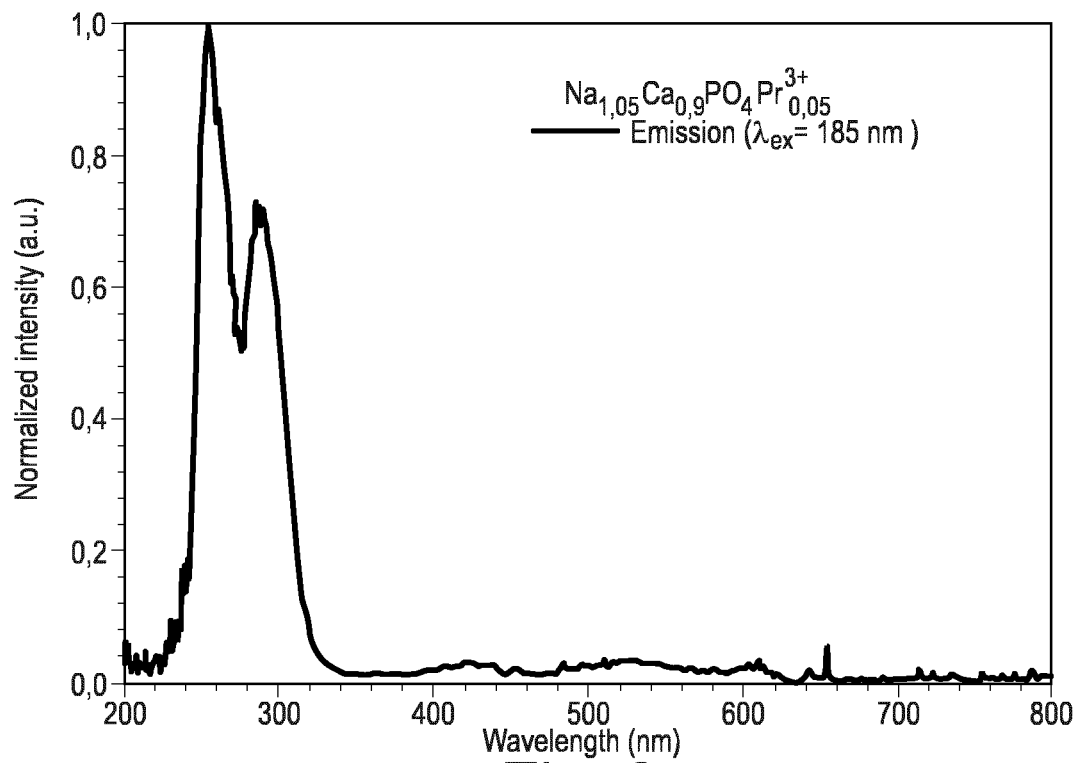
FIG. 3 shows an emission spectrum of an exemplary phosphor $Na_{1.05}Ca_{0.9}PO_4:Pr^{3+}_{0.05}$, according to an embodiment of the present invention.
Figure 4:
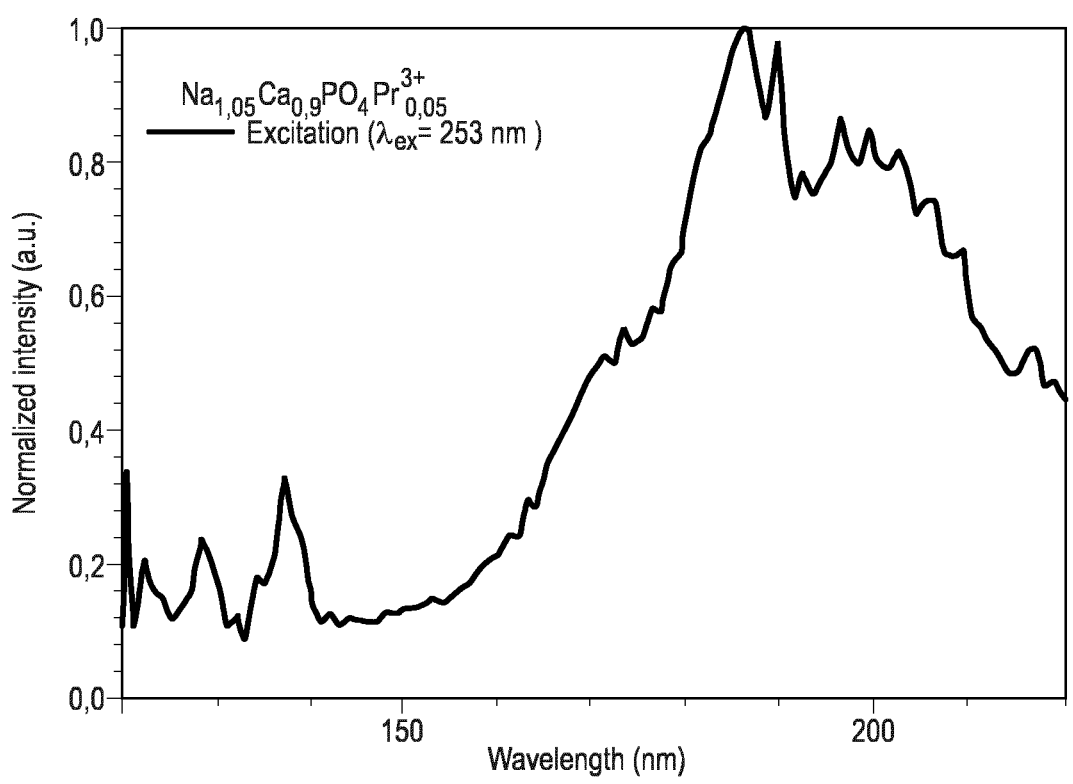
FIG. 4 shows an excitation spectrum of an exemplary phosphor $Na_{1.05}Ca_{0.9}PO_4:Pr^{3+}_{0.05}$, according to an embodiment of the present invention.

The XRD pattern and the reflection, emission and excitation spectra of the prepared material are shown in FIGS. 1-4.

The invention claimed is:

1. A phosphor for a UV emitting device, having the formula $$Na_{1+x}Ca_{1-2x}PO_4:PR^{3+}_x,$$

wherein
0.01<x<0.1, and
wherein the phosphor is configured to convert vacuum ultraviolet (VUV) radiation to UV-C radiation.

2. The phosphor of claim 1, wherein the value of x is 0.03<x<0.07.

3. A phosphor according to claim 1, characterized in that the value of x is 0.04<x<0.06.

4. The phosphor of claim 1, wherein the phosphor is essentially free of Yttrium.

5. A UV generating device comprising a phosphor according to claim 1 and a UV radiation source.

6. The phosphor according to claim 1, wherein the phosphor is excited by a light having a wavelength of 172 nm and 185 nm to emit an ultraviolet light in the range of 230 nm to 260 nm.

7. A method comprising:
providing a phosphor having the formula: $Na_{1+x}Ca_{1-2x}PO_4:PR^{3+}_x$, wherein 0<x<0.5;
exposing the phosphor to VUV radiation; and
converting the VUV radiation to UV-C radiation using the phosphor.

8. The method of claim 7, further comprising placing the phosphor inside a gas discharge lamp.

9. The method according to claim 7, further comprising exposing water or wastewater to the UV-C radiation emitted by the phosphor.

10. A UV generating device comprising:
a phosphor having the formula $Na_{1+x}Ca_{1-2x}PO_4:PR^{3+}_x$, wherein 0<x<0.5, and
a UV radiation source comprising a gas discharge lamp.

11. The UV generating device according to claim 10, wherein the UV radiation source comprises a low pressure mercury gas discharge lamp.

12. The UV generating device according to claim 10, wherein the UV radiation source comprises a low pressure mercury amalgam gas discharge lamp.

13. The UV generating device according to claim 10, wherein the UV radiation source comprises an excimer lamp.

14. The UV generating device according to claim 13, wherein the UV radiation source comprises an excimer gas discharge lamp with a gas filling that predominately emits a second Xenon excimer continuum.

15. The UV generating device according to claim 13, wherein the UV radiation source comprises an excimer gas discharge lamp with a gas filling that is essentially free of mercury.

16. The UV generating device according to claim 14, wherein the gas filling contains more than 50% by volume of Xenon.

17. The UV generating device according to claim 14, wherein upon excitation the phosphor emits an ultraviolet light in the range of 230 nm to 260 nm.

* * * * *